United States Patent [19]

Evans et al.

[11] 4,237,032

[45] Dec. 2, 1980

[54] CATALYSTS

[75] Inventors: William D. J. Evans, Newton; Robert J. Larbey, Bassingbourn; Thomas I. Stewart, Melbourn, all of England

[73] Assignee: Johnson, Matthey & Co., Limited, London, England

[21] Appl. No.: 912,966

[22] Filed: Jun. 6, 1978

[30] Foreign Application Priority Data

Jun. 8, 1977 [GB] United Kingdom ............... 23913/77

[51] Int. Cl.$^3$ .................. B01J 23/10; B01J 23/64; B01J 23/84; B01J 23/58
[52] U.S. Cl. ................................ 252/462; 252/473; 423/213.5
[58] Field of Search ........... 252/462, 472, 460, 466 B, 252/470, 473; 423/213.5

[56] References Cited

U.S. PATENT DOCUMENTS

| | | | |
|---|---|---|---|
| 3,839,224 | 10/1974 | Yonehara et al. | 252/477 R |
| 3,840,471 | 10/1974 | Acres | 252/462 |
| 3,905,918 | 9/1975 | Mai et al. | 252/462 |
| 3,919,120 | 11/1975 | Kato et al. | 423/213.5 |
| 4,001,143 | 1/1977 | McCann | 252/462 |
| 4,006,103 | 2/1977 | Meguerian et al. | 252/466 B |
| 4,049,583 | 9/1977 | Lauder | 252/462 X |

*Primary Examiner*—W. J. Shine
*Attorney, Agent, or Firm*—Cushman, Darby & Cushman

[57] ABSTRACT

A supported catalyst suitable for catalyzing oxidation and reduction processes in a gas and capable of removing oxygen from a gas containing an excess of oxygen and restoring at least a part of such removed oxygen to a gas having an oxygen deficiency, comprising (A) a substrate; (B) a washcoat on said substrate comprising at least one refractory metal oxide and nickel; and (C) a catalytically active coating attached to said substrate by said washcoat, said catalytically active coating comprising at least one of the precious metals platinum, rhodium, ruthenium, palladium, iridium, osmium, gold and silver.

7 Claims, No Drawings

CATALYSTS

This invention relates to catalysts. More particularly, the invention is concerned with catalysts suitable for the catalytic oxidation of hydrocarbons and carbon monoxide and for the catalytic reduction of oxides of nitrogen in the presence, respectively, of suitable oxidising and reducing means.

The invention is especially concerned with the catalytic purification of the exhaust gases of petrol driven internal combustion engines and of diesel engines but is by no means so limited.

The words "gas" and "gases" in this specification are to be taken as meaning a gas or gases per se, a vapour or vapours or a mixture or mixtures containing one or more gases and one or more vapours.

The components of exhaust gases of the type just referred to may generally for convenience be divided into two groups. The first group contains components which are, or will act as reducing agents and can hence be oxidised and the second, components which are or will act as oxidising agents and can hence be reduced. By "purification" of exhaust gases in this specification is meant the oxidation of at least a proportion of any components of the said first group and the reduction of at least a proportion of any components of the said second group so as to form one or more of at least the products water, carbon dioxide and nitrogen.

Typical members of the first group are carbon monoxide and hydrocarbons formed by the incomplete combustion of fuel in the engine e.g. hydrocarbons in the shape of unburnt but vapourised fuel and hydrogen gas. The principal members of the second group are oxides of nitrogen, often referred to collectively as "$NO_x$", and oxygen.

Ideally the components of the first and second groups would be in stoichiometric balance in an exhaust stream so that by passing such an exhaust over a suitable catalyst, the said components could be caused to interact and to effect mutual oxidation and reduction with the formation, for example, of carbon dioxide, water and nitrogen and without leaving any residual unreacted gas or gases. Such a stoichiometric balance hardly ever occurs in practice, however, except perhaps momentarily. In fact, the relative proportions of the various components in the exhaust stream from an internal combustion or diesel engine, in addition to varying from engine to engine as a result of, among other things, the design of the engine, the actual operating temperature of the engine and its state of tune, will also vary during the operation of a particular engine and will be governed by such factors as the degree of throttle opening. In fact the variation in exhaust composition in practice is such that there are occasions when components of the first (the oxidisable) group preponderate and occasions when those of the second (the reducible) group are in excess.

In general, the variations in exhaust composition just described will correspond to excursions firstly on the "rich" and secondly on the "lean" side of a stoichiometric input mixture of air and fuel to the engine, so that firstly there will be an excess of fuel and secondly an excess of air in the input. This means that a "rich" input mixture will lead to an exhaust stream which is relatively deficient in oxygen and a "lean" mixture which will lead to an exhaust stream containing a relative excess of oxygen.

If a catalyst of the type currently available for the purification of exhaust gases, such as a supported rhodium-platinum catalyst, is used in an exhaust stream for the oxidation of such components as carbon monoxide, hydrocarbons and hydrogen gas and for the reduction of oxides of nitrogen, a relative deficiency of oxygen in the exhaust stream as described above, will reduce the efficiency of the catalytic oxidation process. Conversely, a relative excess of oxygen will militate against the catalytic reduction process. This latter effect is particularly marked with rhodium-platinum catalysts with which $NO_x$ reduction seems to be especially easily "poisoned" by an excess of oxygen.

In co-pending, U.S. Pat. application Ser. No. 777,308, filed Mar. 14, 1977 there are described and claimed catalysts suitable, inter alia, for the purification of the exhaust gases of petrol driven internal combustion engines and of diesel engines and in which certain disadvantages of prior art catalysts are overcome. In particular, these catalysts of the indicated co-pending patent application comprise, one or more of the metals platinum, rhodium, ruthenium, palladium, indium, osmium, gold and silver, and one or more base metals at least one of which has two or more oxidation states, and are such that they are capable of removing oxygen from a gas (as herein defined) containing an excess of oxygen and restoring at least a part of such removed oxygen to a gas having an oxygen deficiency.

These catalysts which may contain at least one of the metals as an oxide, are preferably supported catalysts. Suitable substrates on which they may be supported are rigid honeycomb structures provided with a plurality of longitudinally extending channels to the surfaces of which is applied a layer or "washcoat" comprising one or more of the oxides of aluminium, magnesium, calcium, strontium, barium, scandium, yttrium, the lanthanides, gallium, indium, thallium, silicon, titanium, zirconium, hafnium, thorium, germanium, tin, lead, vanadium, niobium, tantalum, chromium, molybdenum, tungsten and rhenium, the catalyst being "supported" on the washcoat. The washcoat thus constitutes the "carrier" or "support" for the catalyst and some or all of the oxides may be in the form of a perovskite.

The expression "supported" in the above context generally implies that the catalyst metals may be disposed in part below the surface of the washcoat. In Ser. No. 777,308 the catalyst comprises a support or carrier (the washcoat) to which is applied and/or which is impregnated with at least one of the platinum group metals platinum, rhodium, ruthenium, palladium, iridium and osmium and at least one of a number of specified base metals. In the said U.S. application the following base metals are mentioned, viz., cobalt, manganese, nickel, zinc, tin, tungsten, cerium, iron, copper, praseodymium, rhenium, chromium, molybdenum, lanthanum, calcium, strontium, barium, zirconium and gadolinium. In addition to the said one or more base metals, one or more base metals are selected from the group consisting of the rare earth metals (excluding lanthanum and praseodymium) and base metals of the first, second and third transition series of the Periodic table. The base metal is preferably present in an amount of not less than 5 wt.% considered in relation to the total quantity of base and platinum group metal present in the catalyst. Conveniently the alloy contains 25–99.9 or 70–97 e.g. 94 wt.% of base metal.

We have found that the performance of a catalyst according to the invention of the indicated U.S. application is, at least under certain circumstances, improved if the catalyst is supported on a wash-coat and the washcoat is impregnated with, or, within the washcoat there is dispersed, at least part of the base metal of the catalyst.

According to the present invention, therefore, a supported catalyst suitable for catalysing oxidation and reduction processes in a gas (as herein defined) and capable of removing oxygen from a gas containing an excess of oxygen and restoring at least a part of such removed oxygen to a gas having an oxygen deficiency, comprises at least one of the metals of platinum, rhodium, ruthenium, palladium, iridium, osmium, gold, and silver and one or more base metals at least one of which has two or more oxidation states, the catalyst support comprising one or more refractory metal oxides which is or are impregnated with, or within which is dispersed, part at least of the base metal of the catalyst.

Two or more of the metals referred to above, namely, the base metals and the platinum group metals, gold and silver may be in the form of a perovskite. Particularly preferred base metals are cobalt and cerium which may be used separately or together. By a perovskite is meant a mixed oxide system of the form $ABO_3$, where A and B each represent one or more metals such that the A cation is coordinated with 12 oxygen ions and the B cation with 6 oxygen ions. It follows that the A cation will normally be found to be somewhat larger than the B cation. In order for there to be contact between the A,B and O ions, $R_A + R_O$ should be equal to $\sqrt{2(R_B + R_O)}$ where $R_A$, $R_B$ and $R_O$ are the ionic radii. In practice A may represent one or more rare earth metals and B may represent one or more metals of the first, second and third transition series of the Periodic Table.

If desired one or more of the said metals may be in the form of the oxide, e.g. copper chromite $CuCrO_4$.

The base metals may be barium and rhenium present in the form of barium mesoperrhenate.

EXAMPLE 1

(a) a suspension suitable for coating a ceramic honeycomb monolith with a layer containing 1 pbw of perovskite and 2 pbw of alumina which, on firing, will constitute the support or carrier previously referred to is prepared by slurrying together perovskite material and alumina monohydrate in water. Following this the pH of the slurry is adjusted to a value of 3.8–4.0 by the addition of nitric acid. A ceramic honeycomb substrate is next dipped into the slurry, allowed to drain so that the passageways become clear, dried and then fired at 550° C. for 30 minutes. This process is then repeated so that the weight of washcoat material on the fired monolith amounts to 2.0–2.4 grams per cubic inch of the washcoated monolith. Suitable perovskite materials are $La_{0.8}Sr_{0.2}CoO_3$ and $La_{0.8}Ba_{0.2}CoO_3$. These may be prepared for firing the co-precipitated carbonates of the metals as described in Ser. No. 777,308. Other perovskites are $La_{0.8}Ba_{0.2}Co_{0.987}Rh_{0.013}O_3$ and where $Ba_{0.2}$ is replaced by $Sr_{0.2}$.

(b) The fired washcoated monolith formed in stage (a) is next dipped in an aqueous solution of a nickel salt such as nickel nitrate, dried and then fired at 650° C. for 30 minutes. The concentration of the nickel nitrate should be such as to produce a deposit on and in the washcoat of nickel as the metal and/or the oxide of from 100–120 grams per cubic foot of the washcoated monolith.

(c) The process of stage (b) is repeated except that the solution contains tetrammine platinum chloride (TPC)$Pt(NH_3)_4Cl_2$, Claus' salt $Rh(NH_3)_5ClCl_2$ and, optionally, barium and/or lanthanum nitrate. The relative quantities of the platinum and rhodium salts are such as to correspond to a ratio of platinum to rhodium of 11 to 1 and the total quantity of platinum and rhodium salts is sufficient to give a precious metal concentration in the washcoated and fired monolith of 40 grams per cubic foot of the so-treated monolith. Finally the quantity of any barium and/or lanthanum nitrate present is such as to introduce 4 wt.% of barium or lanthanum or of a mixture of the two into the fired washcoat. The presence of barium and/or lanthanum in the washcoat has the effect of improving the surface area stability of the washcoat at high temperatures. Lanthanum has the additional effect of improving the resistance to sintering of the rhodium by reason of the formation of lanthanum rhodite.

EXAMPLE 2

In another process for preparing a catalyst in accordance with this invention stage (a) is carried out as in Example 1 but the nickel salt is added to the solution used for stage (c). Stages (b) and (c) of Example 1 are thus combined.

EXAMPLE 3

Yet another catalyst according to the invention may be prepared by carrying out the process of Example 2 above but with the quantity of nickel salt increased to give a nickel metal and/or nickel oxide deposit on and in the washcoat corresponding to a nickel "loading" of from 180–200 grams of nickel per cubic foot of the washcoated monolith.

EXAMPLE 4

(a) In the process of this example, alumina particles are slurried in nickel salt (e.g. nickel nitrate) solution, removed, dried and fired at 550° for 120 minutes and then milled to give a finely divided composite washcoat material.

(b) The washcoat material is next dispersed in water to form a slurry into which the ceramic monolith is dipped and, on removal, allowed to drain until the passages are clear, dried and then fired at 550° C. for 60 minutes. The process is then repeated so that, as in Example 1 (a) the weight of the washcoat on the fired monolith will amount to 1.5–2.0 grams per cubic inch of the monolith.

(c) Finally, the fired, washcoated monolith is dipped into a solution of TPC, Claus' salt and cerium nitrate to give a "loading" of 100 grams of cerium per cubic foot of the washcoated monolith. As before in Example 1 (c) the concentrations of TPC and Claus' salt are such as to give a ratio of platinum to rhodium of 11/1 by weight and a precious metal loading of 40 grams per cubic foot of the washcoated monolith.

EXAMPLE 5

In a still further process for the preparation of a catalyst according to the invention, a ceramic honeycomb monolith is coated with a perovskite/alumina washcoat as described in section (a) of Example 1. Next, the resulting washcoated honeycomb is treated in a similar manner to stage (c) of Example 1 except that in this case it is dipped into a mixed solution of nickel and cerium salts, such as the nitrates of these two metals. Further, the nickel and cerium nitrate concentrations are such as to produce deposits in and on the washcoat, after firing, of 200 grams of nickel as the oxide and/or the metal and 100 grams of cerium as the oxide per cubic foot of the washcoated monolith. Finally, the monolith treated as just described is impregnated with platinum and rhodium by immersing it in an aqueous solution of the ammine complexes of these metals and then draining, drying and firing it. The ratio of platinum to rhodium in this case is 11/1 by weight and the precious metal loading is 40 g per cubic foot of the washcoated monolith, the concentrations of the ammine complexes in the impregnating solution being chosen accordingly.

EXAMPLE 6

In this example, alumina is impregnated with nickel and cerium nitrates by stirring it in a mixed solution of these nitrates. Next the so-treated alumina is dried and fired, slurried with nitric acid and water and then passed several times through a colloid mill. Following this, a ceramic monolith is dipped in an aqueous slurry of the ground, impregnated slumina, drained, dried and then fired so as to form a "washcoat" on the monolith in which the weight of the washcoat amounts to 1.5–2.0 grams per cubic inch of the monolith. Finally, the washcoated monolith is impregnated with platinum and rhodium by treating it with an aqueous solution of the ammine complexes of these metals as in Example 5. The ratio of platinum to rhodium and the precious metal loading are as in that Example and the concentrations of nickel and cerium nitrates, in the initial impregnation step, are such as to give about 200 g of nickel and about 100 g of cerium as the oxides per cubic foot of finished catalyst.

The foregoing description of methods of preparing catalysts according to the invention are by way of example only and many other methods can be employed. Further, although a catalyst according to the invention is eminently suitable for the purification of motor car exhaust gases, it is by no means so limited in its application. It may in fact be used for catalysing many other oxidation and reduction reactions, depending upon the reaction conditions. We have found, in particular, that catalysts according to the invention containing a high proportion of nickel, such as nickel, rhodium, platinum catalysts in which the nickel content is about 80 wt.% of the metals nickel, rhodium and platinum are especially useful for the chemical reduction of oxides of nitrogen whether in car exhaust gases or otherwise.

What we claim is:

1. A supported catalyst suitable for catalyzing oxidation and reduction processes in a gas and capable of removing oxygen from a gas containing an excess of oxygen and restoring at least a part of such removed oxygen to a gas having an oxygen deficiency, comprising (A) a substrate; (B) a washcoat as a support on said substrate comprising at least one refractory metal oxide and nickel and cerium as base metal components; and (C) a catalytically active coating attached to said substrate by said washcoat, said catalytically active coating comprising at least one of the precious metals platinum, rhodium, ruthenium, palladium, iridium, osmium, gold and silver.

2. A catalyst according to claim 1 including a total of not less than 5 wt.% base metal component in said catalyst, considered in relation to the total quantity of base and precious metal present in the catalyst.

3. A catalyst according to claim 2 containing a total of 25 to 99.9 wt.% base metal.

4. A catalyst according to claim 3 containing a total of 70 to 97 wt.% base metal.

5. A catalyst according to claim 3 containing 94 wt.% base metal.

6. A supported catalyst suitable for catalyzing oxidation and reduction processes in a gas and capable of removing oxygen from a gas containing an excess of oxygen and restoring at least a part of such removed oxygen to a gas having an oxygen deficiency, comprising (A) a substrate; (B) a washcoat as a support on said substrate comprising at least one refractory metal oxide and a perovskite selected from the group consisting of $La_{0.8}Sr_{0.2}CoO_3$,
$La_{0.8}Ba_{0.2}CoO_3$,
$La_{0.8}Ba_{0.2}Co_{0.987}Rh_{0.013}O_3$ and
$La_{0.8}Sr_{0.2}Co_{0.98}Rh_{0.013}O_3$;

and (C) a catalytically active coating attached to said substrate by said washcoat, said catalytically active coating comprising at least one of the precious metals platinum, rhodium, ruthenium, palladium, iridium, osmium, gold and silver.

7. A supported catalyst suitable for catalyzing oxidation and reduction processes in a gas and capable of removing oxygen from a gas containing an excess of oxygen and restoring at least a part of such removed oxygen to a gas having an oxygen deficiency, comprising (A) a substrate; (B) a washcoat as a support on said substrate comprising at least one refractory metal oxide and barium and rhenium in the form of barium mesoperrhenate; and (C) a catalytically active coating attached to said substrate by said washcoat, said catalytically active coating comprising at least one of the precious metals platinum, rhodium, ruthenium, palladium, iridium, osmium, gold and silver.

* * * * *